Patented Nov. 13, 1923.

1,473,750

UNITED STATES PATENT OFFICE.

FRED W. WAGNER, OF PITTSBURGH, PENNSYLVANIA.

PURIFICATION OF WASTE LIQUORS.

No Drawing.   Application filed May 18, 1922.   Serial No. 561,787.

*To all whom it may concern:*

Be it known that I, FRED W. WAGNER, residing at Pittsburgh, in the county of Allegheny and State of Pennsylvania, a citizen of the United States, have invented or discovered certain new and useful Improvements in the Purification of Waste Liquors, of which improvements the following is a specification.

My invention relates to the purification of waste liquids, and particularly to the removal of hydrocarbon acids, from aqueous solution. It finds its immediate applicability in the purification of waste waters derived from the operation of by-product coke plants.

In the operation of a by-product coke plant the gases passing from the coking chamber are initially cooled, and in consequence of such cooling a liquid condensate separates itself from the main body of gas. This condensate is subjected to a decantation operation, and by decantation two components are separated: tar and ammonia solution. The remaining liquid from which the components just named have been separated is still rich in ammonia. The ammonia is removed from it by distillation; the residue is waste. This waste liquid passing from the ammonia still is essentially aqueous; it is reddish brown in color and is clouded by the presence of solid matter in suspension; it is somewhat heavier than water. It carries in solution and in suspension various substances, among them phenol and cresol, hydrocyanic acid, hydrogen sulphide, thyocyanates, calcium salts, and various impurities.

Of these, the substances which constitute, for reasons presently to be stated, the chief source of difficulty, are phenol, cresol, hydrocyanic acid, and hydrogen sulphide. These all are soluble in water, and are carried in the waste liquid in solution.

This waste liquid is difficult of disposal. If discharged into streams the phenol and cresol components give to the water an offensive taste, and this effect is pronounced and far-reaching, for a very minute trace is objectionable; hydrogen sulphide, present in stream water, gives to it an offensive odor; hydrocyanic acid attacks metal, and when present in water used for industrial and domestic purposes is destructive of pipes and plumbing. These difficulties are of such magnitude that the operator of a by-product coke plant who disregards them will in most localities find himself confronted with laws respecting stream polution and nuisances.

My invention is addressed to the treatment of this waste liquid from the ammonia still, and its object, as has already been intimated, is the removal of substances objectionable because of stream pollution.

The waste liquor as it comes from the ammonia still may, advantageously, be filtered initially, to remove from it adventitious particles of solid substance.

The first step of my operation consists in neutralizing the liquor with sulphuric acid. For this purpose I use commercial sulphuric acid, having a gravity of approximately 66° Baumé. After adding sulphuric acid until the liquor shows neutral reaction, I allow it to stand for approximately an hour and a half, in order that the salts precipitated by the addition of the acid may settle. I then decant the clear liquor above.

This liquor, at a temperature of about 95° C., I bring into intimate contact with coke-oven gas. This contact of liquor with gas may be brought about in any preferred manner and in any preferred apparatus. The apparatus which I employ is a vertically standing cylindrical chamber with gas inlet below and gas exit above, having a succession of transversely extending wooden grids set in vertical succession at intervals within, and having a liquid inflow pipe terminating in a spray nozzle above and a liquid outflow pipe below. Such "towers" are well known, and require no more particular description here.

The coke-oven gas may initially be debensolized by washing with petroleum or petroleum derivative or equivalent absorbent of benzol, but such initial washing is not necessary. The gas is introduced into the tower at atmospheric temperature; or substantially so.

The separation of the undesired impurities effected by the intermingling of the liquor with coke-oven gas is, I believe, in part mechanical, in part chemical. Some of the impurities are undoubtedly carried away by the gaseous stream unchanged chemically though in gaseous or vaporous condition, others are chemically broken down and the resulting substances are carried away, to the extent at least, that objectionable impurities do not remain in appreciable quantities. Actual tests show removal by this treatment as follows,

|  | Grams per liter. | Percentage removed. |
| --- | --- | --- |
| Solids | 1.09 | 93.3 |
| Organic matter | .27 | 95.8 |
| Sulphocyanides | .027 | 95.8 |
| Ferro-cyanide | Trace. | 99.0 |
| Phenol | .17 | 88.5 |

The liquor escaping from the tower is preferably filtered again, and it may then be discharged to a natural drainage system, where it is unobjectionable.

The active principle in such chemical reaction as takes place is, I believe the free hydrogen and perhaps the methane present in the coke-oven gas, and, although commercial conditions forbid the use of such expensive material as pure hydrogen gas, I have reason to believe that reducing gases generally will in greater or less degree be effective to achieve my ends.

I claim as my invention:

1. The method herein described of purifying the waste liquor from an ammonia still which consists in neutralizing the liquor with additions of acid, separating the resultant liquid from the precipitate, mingling with the so separated liquid coke-oven gas, and after mingling allowing the liquid and gaseous resultants to separate.

2. The method herein described of purifying the waste liquor from an ammonia still which consists in neutralizing the liquor with additions of sulphuric acid, separating from the precipitate the resultant liquid, and causing the liquid so separated while at a temperature of approximately 95° C. to come into intimate contact with a flowing stream of coke-oven gas at substantially atmospheric temperature.

3. The method herein described of purifying the waste liquor from an ammonia still which consists in neutralizing the liquor with additions of acid, separating from the precipitate the resultant liquid, and treating the resultant liquid with a reducing gas.

In testimony whereof I have hereunto set my hand.

FRED W. WAGNER.

Witnesses:
R. W. CAMPBELL,
H. L. McCOLLUM.